US010038512B1

(12) United States Patent
van de Water

(10) Patent No.: US 10,038,512 B1
(45) Date of Patent: Jul. 31, 2018

(54) METHODS AND APPARATUS FOR CONTROLLING FRAME TIMING AND/OR DURATION IN A COMMUNICATIONS SYSTEM

(71) Applicant: PROXIM WIRELESS CORPORATION, Fremont, CA (US)

(72) Inventor: Cornelis van de Water, Sunnyvale, CA (US)

(73) Assignee: Proxim Wireless Corporation, Fremont, CA (US)

( * ) Notice: Subject to any disclaimer, the term of this patent is extended or adjusted under 35 U.S.C. 154(b) by 202 days.

(21) Appl. No.: 14/988,669

(22) Filed: Jan. 5, 2016

Related U.S. Application Data

(60) Provisional application No. 62/100,402, filed on Jan. 6, 2015.

(51) Int. Cl.
  *H04J 3/16* (2006.01)
  *H04W 72/04* (2009.01)
  *H04W 72/08* (2009.01)

(52) U.S. Cl.
  CPC ....... *H04J 3/1682* (2013.01); *H04W 72/0446* (2013.01); *H04W 72/082* (2013.01)

(58) Field of Classification Search
  CPC ............ H04J 3/1682; H04W 72/0446; H04W 72/082
  See application file for complete search history.

(56) References Cited

U.S. PATENT DOCUMENTS

| 2013/0003674 | A1* | 1/2013 | Lin ...................... H04W 16/14 370/329 |
| 2013/0039205 | A1* | 2/2013 | Murakami ............... H04B 5/00 370/252 |
| 2013/0194984 | A1* | 8/2013 | Cheng ................. H04W 72/082 370/294 |
| 2016/0309491 | A1* | 10/2016 | Dai ....................... H04W 72/04 |
| 2017/0005743 | A1* | 1/2017 | Lindoff .................. H04J 11/005 |

* cited by examiner

*Primary Examiner* — Luat Phung
(74) *Attorney, Agent, or Firm* — Straub & Straub; Michael P. Straub; Stephen T. Straub

(57) ABSTRACT

Methods and apparatus for controlling frame timing and/or duration in a wireless communications network are described. Recurring interference is monitored for, detected and evaluated. Frame structure to be used in the network is determined based on the detected recurring interference in one or more monitored frequency bands. An implemented frame structure is changed dynamically in response to a detected new pattern of interference. Uplink and downlink timing and frame duration maybe determined separately, e.g., based on interference which affects uplink and downlink communications, respectively. Devices, e.g., base stations, may independently determine frame start times and durations based on detected interference or may communicate with one another to reach a consensus on a frame start time and duration to be used by multiple base stations. Downlink frame start times and durations may be based on interference information reported by one or more devices, e.g., mobile user equipment devices.

19 Claims, 10 Drawing Sheets

| FIGURE 2A |
| FIGURE 2B |

METHODS AND APPARATUS FOR CONTROLLING FRAME TIMING AND/OR DURATION IN A COMMUNICATIONS SYSTEM

RELATED APPLICATIONS

The present application claims the benefit of U.S. Provisional Patent Application No. 62/100,402, filed Jan. 6, 2015 entitled "METHODS AND APPARATUS FOR CONTROLLING FRAME TIMING AND/OR DURATION IN A COMMUNICATIONS SYSTEM", which is hereby incorporated by reference in its entirety.

FIELD

The present application relates to wireless communications systems and, more particularly to methods and apparatus for controlling frame timing and/or frame duration in a communications system.

BACKGROUND

For efficient communication of information and power usage, devices in a communications system often try to operate in a synchronized manner. Synchronization between devices allows for devices to coordinate their wake up times and/or various signaling so that deices can operate in a power efficient manner and still have a good opportunity that a transmitted signal will reach an intended destination device while the device is in a state, e.g., an active or monitoring state, that it is likely to receive and recover the transmitted signal.

In order to synchronize communications, various devices in a network, e.g., WiFi devices in an 802.11 network, may rely on transmission of timing synchronization signals communicated in beacon frames as part of normal communication. In some systems, device may rely on an external timing source such as GPS satellite signals which transmit signaling outside the frequency band being used by the communications device in a network.

While devices may synchronize their internal time clocks to other devices in the same network and such device may base the network timing on an external signal such as a GPS signal received by one or more devices in the network, achieving timing synchronization between devices in a network has little impact on interference from external devices.

In the case of TDMA systems, where different devices may use communications resources at different times, TDMA resources are often allocated or used on a basis of a unit referred to as a frame. The frame duration is often set and fixed for devices in a network or system. In this manner, an based on common synchronization, device can determine when resources are to be used and/or what action is to be taken.

As the number of wireless communications devices increases, interference between devices corresponding to different networks is likely to become more common. Such interference may be from devices corresponding to a different network using the same frequency band but perhaps a different communications technology or even the same technology but a different code or other security intended to prevent communication or eavesdropping on communications. Interference may also be caused by devices using adjacent frequency bands.

Recurring interference may extend across frame boundaries in a TDMA system and may repeat as devices belonging to a different network use the same or an adjacent communications resource, e.g., frequency band. When the interference extends across frame boundaries, it can have a negative impact on two subsequent frames as opposed to be isolated to a single frame. In addition, interference mitigation techniques that may be performed on a per frame basis may be complicated since the interference may apply to limited portions of two frames as opposed to being contained within a single frame making per frame measurements and attempts at interference mitigation less successful than if the interference were contained or limited to a single frame.

In view of the above discussion it should be appreciated that there is a need for methods and/or apparatus which could be used to limit the affect of interference on frames of a communications system where the interference may be recurring or have some predictable pattern.

SUMMARY

Methods and apparatus for limiting the effect of interference in a wireless communications network from one or more devices outside the network are described. In accordance with at least some embodiments, interference in an area in which the network is to operate or is operating is monitored. The periodicity, duration and location of the interference relative to a timing structure, e.g., recurring frame structure, used by the network are determined from the monitored interference.

In various embodiments a base station, e.g., operating as a network or system controller for a region in which the base station is located, determines a frame duration based at least in part on the duration of periodic intervals of interference. The frame duration is selected so that it divides evenly in a detected duration of a recurring periodic interference interval. Frame start times are also determined in some embodiments, at least partially on the location of the start times of the periodic recurring interference intervals. In this manner, frames can be matched to interference intervals so that the amount of time available for frames outside heavy periodic interference can be maximized.

While frame duration may be fixed, frame duration may, and in some embodiments does vary, depending on the expected interference and repetition rate. In this manner, frame duration and location of occurrence can be controlled so that predictable interference can be limited to certain frames while maximizing the amount of time which will be available for transmitting frames which will be free from expected recurring heavy interference.

In order to allow for the configuration of frame duration, the base station operating as the controller transmits frame duration information along with information about the start time of one or more frames in a recurring schedule. The transmitted information about frame duration and start times may, and in some embodiments is, changed as the base station detects a change to an interference pattern in a region.

Different regions of the network may be, and in some embodiments are, controlled by different regional controllers. Accordingly, in a system implemented in accordance with the invention different regions may have different frame durations and/or frame start times in a TDMA schedule which is optimized taking into consideration local interference considerations. While devices in the system may and in some embodiments are, synchronized to the same global time clock, e.g., a GPS time clock, the frame durations and/or start times may be varied to take into consideration local interference from other networks and/or devices.

In view of the above, it should be appreciated that through control of frame times on a regional basis, local interference can be taken into consideration and its effect localized to individual frames where appropriate interference mitigation techniques may be applied, e.g., on a per frame time scale.

An exemplary method of operating a base station, in accordance with some embodiments, includes: determining a periodicity of a first recurring interference signal; and selecting a first frame start time based on the timing of said first recurring interference signal, said first frame start time indicating a start of a first frame; and communicating with a user equipment device during said first frame time. An exemplary base station, in accordance with some embodiments, includes: an interference signal periodicity determination module configured to determine a periodicity of a first recurring interference signal; a frame start time selection module configured to select a first frame start time based on the timing of said first recurring interference signal, said first frame start time indicating a start of a first frame; and a user device communication module configured to communicate with a user equipment device during said first frame time.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
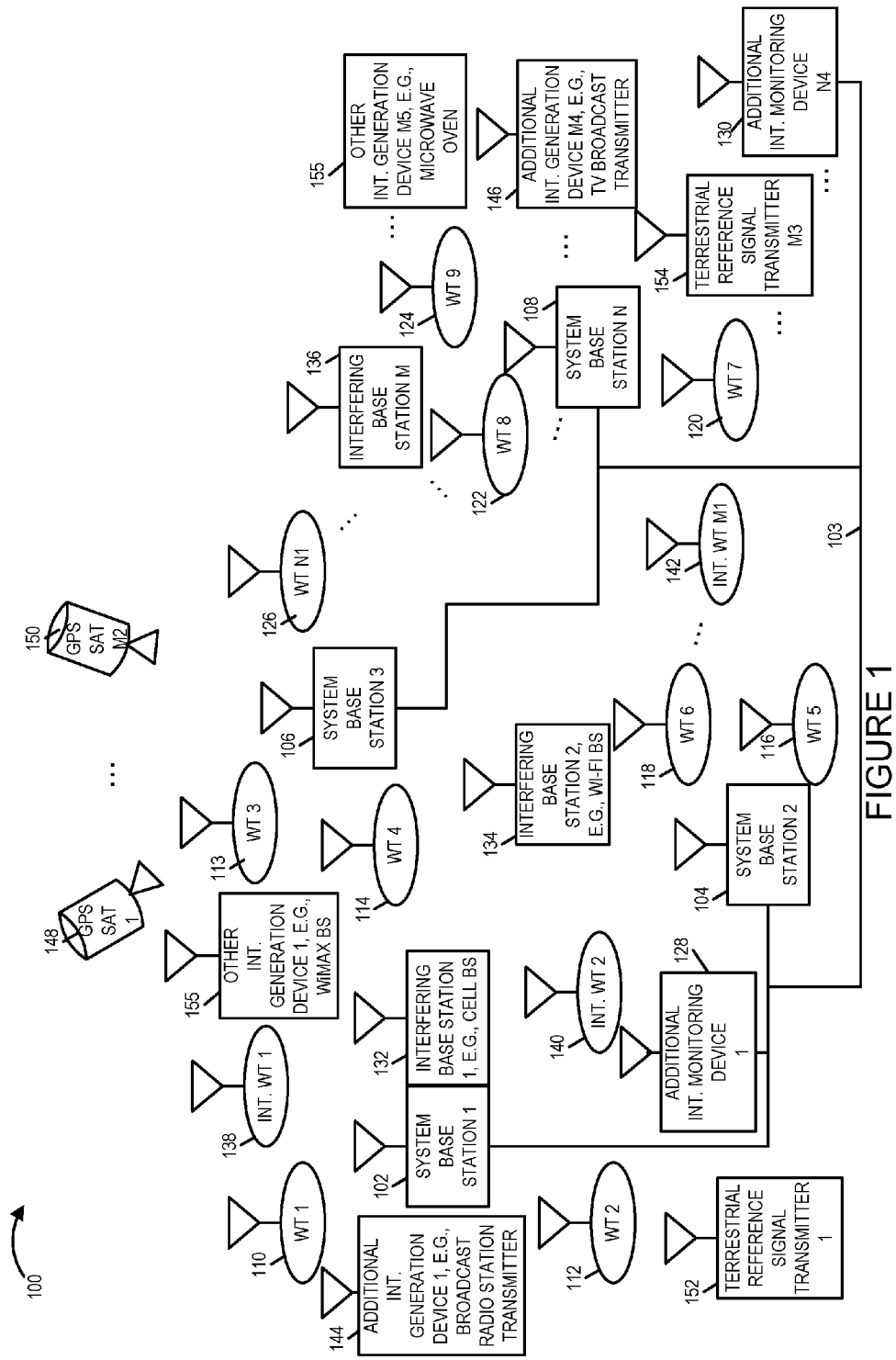
FIG. 1 is a drawing which includes an exemplary wireless communications network which controls its frame timing and duration in response to detected recurring interference signals, in accordance with various exemplary embodiments.

FIG. 1 is a drawing 100 illustrating an exemplary wireless communications network, interfering devices, and devices transmitting reference signals, in accordance with an exemplary embodiment. The exemplary wireless communication network includes a plurality of base stations (system base station 1 102, system base station 2 104, system base station 3 106, . . . , system base station N 108), a plurality of wireless terminals (WT 1 110, WT 2 112, WT 3 113, WT 4 114, WT 5 116, WT 6 118, WT 7 120, WT 8 122, WT 9 124, . . . , WT N1 126), and a plurality of additional interference monitoring devices (additional interference monitoring device 1 128, . . . , additional interference monitoring device N4 130). The wireless terminals are, e.g., user equipment devices, such as mobile UE devices. The system base stations (102, 104, 106, . . . , 108) and the additional interference monitoring devices (128, . . . , 130) are coupled together via a backhaul network 103. A wireless terminal (110, 112, 113, 114, 116, 118, 120, 122, 124, . . . , 126) may, and sometimes do, communicate with a system base station in its vicinity via a wireless communications link. In various embodiments, a system base station in the network, e.g., system base station 1 102, monitors for interference directly, e.g., detecting interference signals over the air. In some embodiments, a wireless terminal in the network, e.g., WT 1 110, also monitors for interference signals over the air and communicates interference information to a system base station via wireless signals. In some such embodiments, the wireless terminal further communications its location information, e.g. GPS information, along with the interference information. In some embodiments, additional monitoring devices, e.g., additional monitoring device 1 128 also monitors for interference signals over the air and communicates the interference information to a system base via the backhaul 103.

The interfering devices include a plurality of interfering base stations (interfering base station 1 132, e.g., a cellular base station corresponding to a cellular network, interfering base station 2 134, e.g., a Wi-Fi base station, . . . , interfering base station M 136), a plurality of interfering wireless terminals (interfering WT 1 138, interfering WT 2 140, . . . , interfering WT M1 142), a plurality of additional interfering generation devices (additional interfering generation device 1 144, e.g., a broadcast radio station transmitter corresponding to a broadcast radio station, . . . , additional interfering generation device M4 146, e.g., a television broadcast transmitter of a television station), and a plurality of other interference generation devices (other interference generation device 1 155, e.g., a WiMAX Base Station, . . . , other interference generation device M5 157, e.g., a microwave oven). Some of the interfering devices may be collocated with a system base station. For example, system base station 102 may be collocated with interfering base station 1 132, e.g., sharing a common mounting structure or mast for their antennas.

The reference signal transmission devices include a plurality of GPS satellites (GPS satellite 1 148, . . . , GPS satellite M2 150), and a plurality of terrestrial reference signal transmitters (terrestrial reference signal transmitter 1 152, . . . , terrestrial reference signal transmitter M3 154). Reference signals from the reference signal transmission devices are used for obtaining timing synchronization in the wireless communications network and/or for determining device position, e.g., WT 1 110 position.

The exemplary communications network is adaptable and responsive to interference in its vicinity and changes in interference in its vicinity. The exemplary communications network monitors for and detects interference signals, e.g., recurring interference signals, and structures its communications frames, e.g., frame start times and frame duration, based on the detected interference.

Figure 2A:
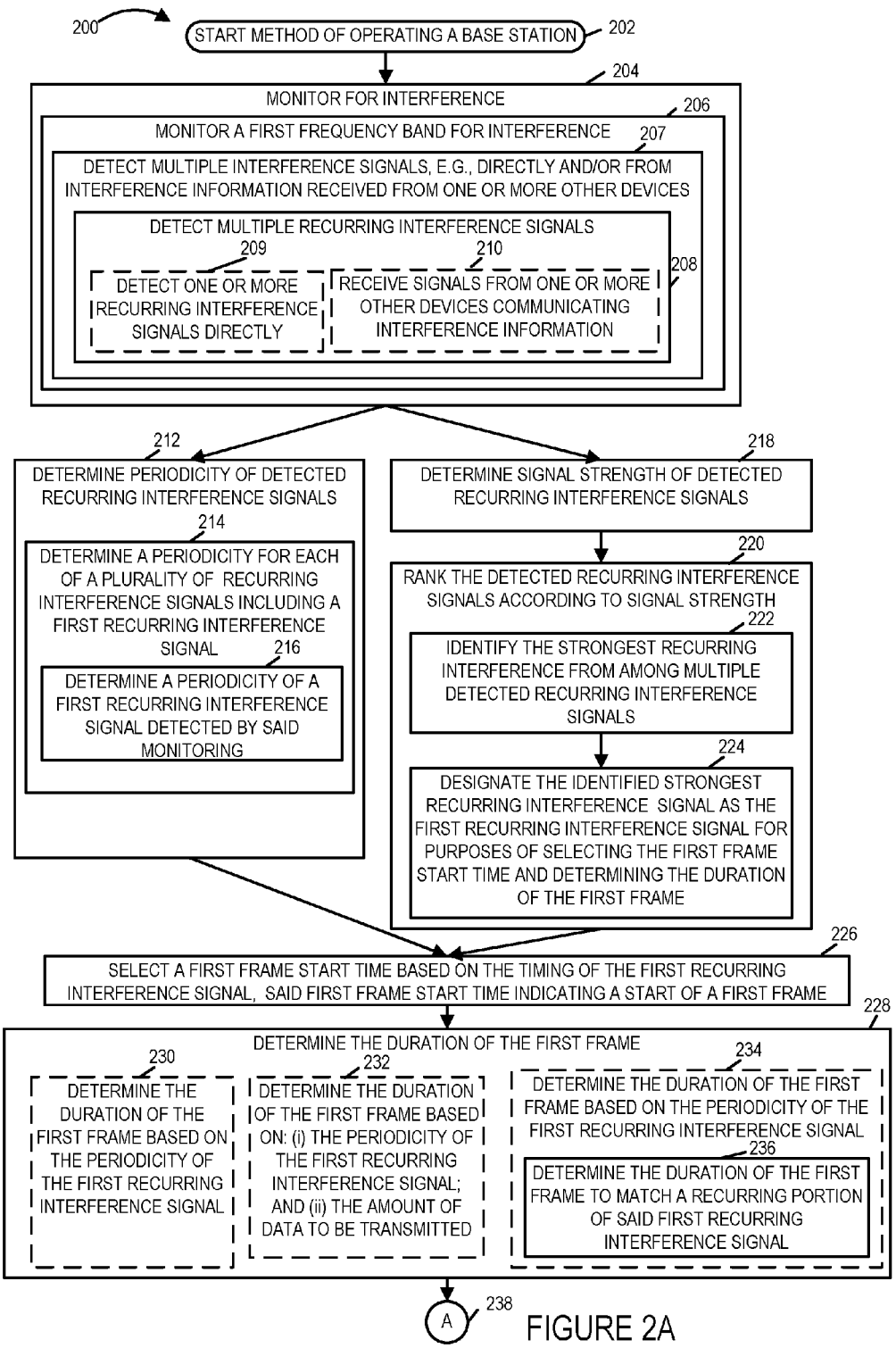
FIG. 2A is a first part of a flowchart of an exemplary method of operating a base station in accordance with various exemplary time division duplex (TDD) embodiments.
Figures 2, 2B:
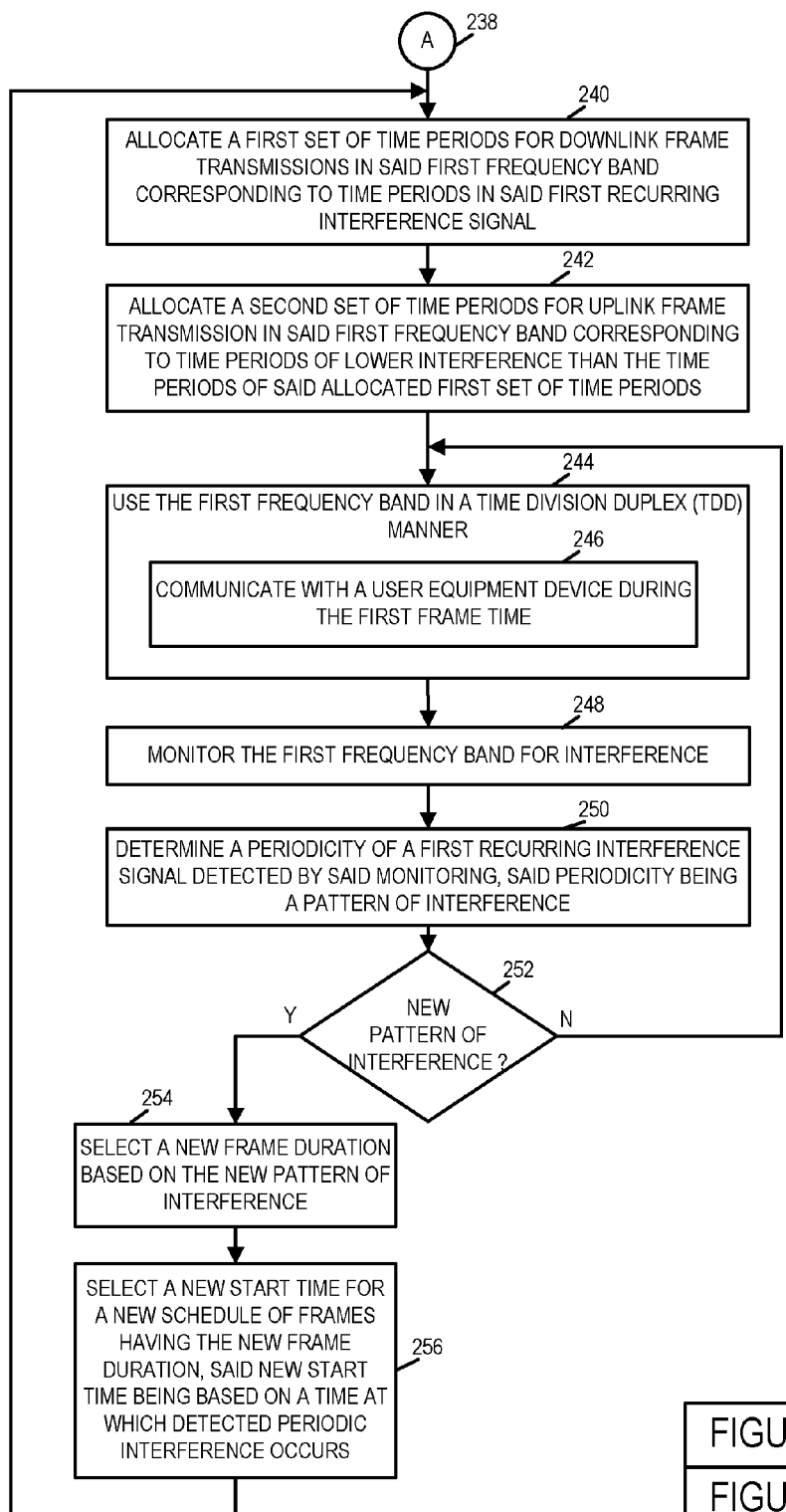
FIG. 2B is a second part of a flowchart of an exemplary method of operating a base station in accordance with various exemplary TDD embodiments.

FIG. 2, comprising the combination of FIG. 2A and FIG. 2B, is a flowchart 200 of an exemplary method of operating a base station, e.g., system base station 1 102, in accordance with an exemplary embodiment. The exemplary method starts in step 202, in which the base station is powered on and initialized. Operation proceeds from step 202 to step 204.

In step 204 the base station monitors for interference. Step 204 includes step 206 in which the base station monitors a first frequency band for interference. The monitoring of step 206 includes detecting a first recurring interference signal. Step 206 includes step 207 in which the base station detects multiple interference signals, e.g., directly and/or from interference information received from one or more other devices. Step 207 includes step 208 in which the base station detects multiple recurring interference signals. Step 208 includes one or both of steps 209 and 210. In step 209 the base station detects one or more recurring interference signals directly, e.g., with a recurring interference signal being received via one of its wireless receivers. In step 210 the base station receives signals from one or more other devices, e.g., WT 1 110, additional interference monitoring device 1 128, and system base station 2 104, communicating interference information.

Operation proceeds from step 204 to step 212 and step 218. In step 212 the base station determines periodicity of detected recurring interference signals. Step 212 includes step 214 in which the base station determines a periodicity for each of a plurality of recurring interference signals including a first recurring interference signal. Step 214 includes step 216 in which the base station determines a periodicity of a first recurring interference signal detected by said monitoring. In various embodiments, the first recurring interference signal is transmitted by a first interfering device, said first interfering device being one of a radio broadcast transmitter corresponding to a broadcast radio station, a television broadcast transmitter of a television station, a cellular network base station corresponding to a cellular network or a WiFi base station, said base station belonging to a network to which the first interfering device does not belong.

In step 218 the base station determines signal strength of detected recurring interference signals. Operation proceeds from step 218 to step 220. In step 220 the base station ranks the detected recurring interference signals according to signal strength. Step 220 includes steps 222 and 224. In step 222 the base station identifies the strongest recurring interference from among multiple detected recurring interference signals. Operation proceeds from step 222 to step 224. In step 224 the base station designates the identified strongest recurring interference signal as the first recurring interference signal for the purposes of selecting the first frame start time and determining the duration of the first frame. Operation proceeds from steps 212 and 220 to step 226.

In step 226 the base station selects a first frame start time based on the timing of the first recurring interference signal, said first frame start time indicating a start of a first frame. Operation proceeds from step 226 to step 228, in which the base station determines the duration of the first frame. In various embodiments, step 228 includes one of steps 230, 232 and 234. In step 230 the base station determines the duration of the first frame based on the periodicity of the first recurring interference signal. In step 232 the base station determines the duration of the first frame based on: i) the periodicity of the first recurring interference signal; and ii) the amount of data to be transmitted. In step 234 the base station determines the duration of the first frame based on the periodicity of the first recurring interference signal. Step 234 includes step 236 in which the base station determines the duration of the first frame to match a recurring portion of said first recurring interference signal. For example, the base station matches the first frame duration to the duration of a recurring signal portion of the first interference signal which may be a frame time or other periodic signal transmission time used by the interfering transmitter. In some embodiments, determining the duration of the first frame is based on one or more or all of: the periodicity of the first recurring interference signal, the amount of data to be transmitted, and identification of a recurring portion of said first recurring interference signal to match the duration of the first frame. Operation proceeds from step 228, via connecting node A 238 to step 240.

In step 240 the base station allocates a first set of time periods for downlink frame transmission in said first frequency band corresponding to time periods in said first recurring interference signal. Operation proceeds from step 240 to step 242. In step 242 the base station allocates a second set of time periods for uplink frame transmission in said first frequency band corresponding to time periods of lower interference than the time periods of said allocated first set of time periods. Operation proceeds from step 242 to step 244.

In step 244 the base station uses the first frequency band in a time division duplex (TDD) manner. Step 244 includes step 246 in which the base station communicates with a user equipment device, e.g., WT 1 110, during the first frame time. Operation proceeds from step 244 to step 248, in which the base station monitors the first frequency band for interference. The monitoring of step 248 may, and sometimes does, detect a new, e.g., different, first recurring interference signal. Operation proceeds from step 248 to step 250 in which the base station determines a periodicity of the first recurring interference signal detected by the monitoring of step 248, said periodicity being a pattern of interference. Operation proceeds from step 250 to step 252, in which the base station determines whether or not there is a new pattern of interference. If there is not a new pattern of interference, then operation proceeds from step 252 to step 244, in which the base station continues to use the first frequency band without making changes to the frame structure. However, if the base station detects a new pattern of interference, then operation proceeds from step 252 to step 254 in which the base station, in response to a new pattern of interference, selects a new from duration based on the new pattern of interference. Operation proceeds from step 254 to step 256 in which the base station selects a new start time for a new schedule of frames have the new frame duration, said new start time being based on a time at which detected periodic interference occurs. Operation proceeds from step 256 to step 240, in which the base station allocates a new first set of time periods of downlink frame transmission in said first frequency band corresponding to time periods in said first recurring signal. Then operation proceeds to step 242 in which the base station allocates a new second set of time periods for uplink frame transmission in said first frequency band corresponding to time periods of lower interference than the time periods of said allocated new first set of time periods. Operation proceeds from step 242 to step 244 in which the base station uses the first frequency band in a time duplex manner.

In various embodiments, using a TDD implementation, a single frequency band is used for uplink and downlink, and a recurring interference in the first frequency band from one or more other devices is identified and uplink and downlink frame times are allocated by the base station based on the detected interference. In some such embodiments, downlink frames are allocated to higher interference periods since the base station is not limited in terms of its supplied power since it normally has a connection to a power line and thus can support high transmission downlink power levels. In some such embodiments, time slots corresponding to low periods of interference are allocated to uplink transmissions, e.g., transmission by mobile UE devices which may be limited in terms of available power since the mobile UE devices are in at least some cases, battery powered devices.

Figure 3A:
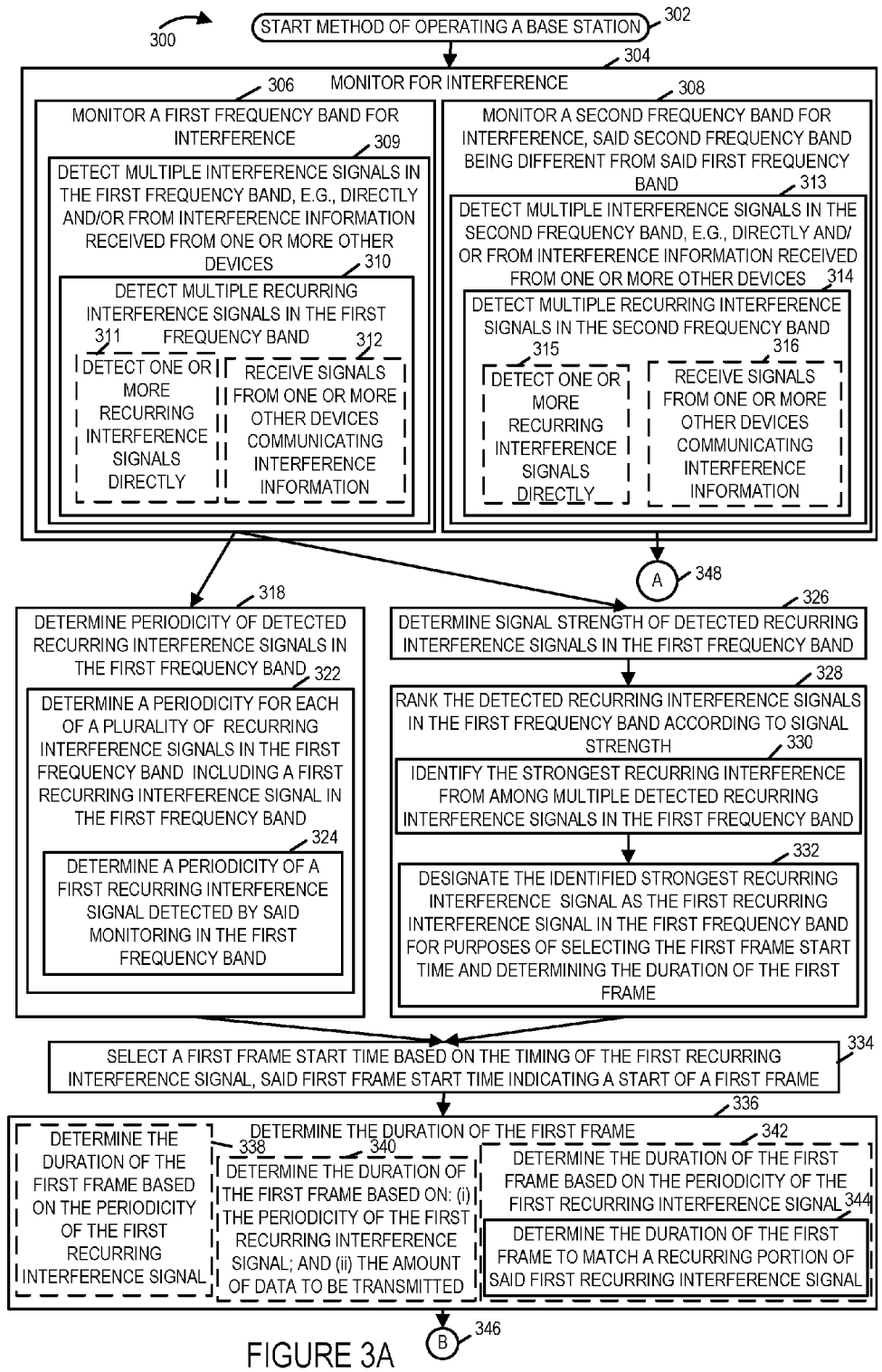
FIG. 3A is a first part of a flowchart of an exemplary method of operating a base station in accordance with various exemplary frequency division duplex (FDD) embodiments.
Figure 3B:
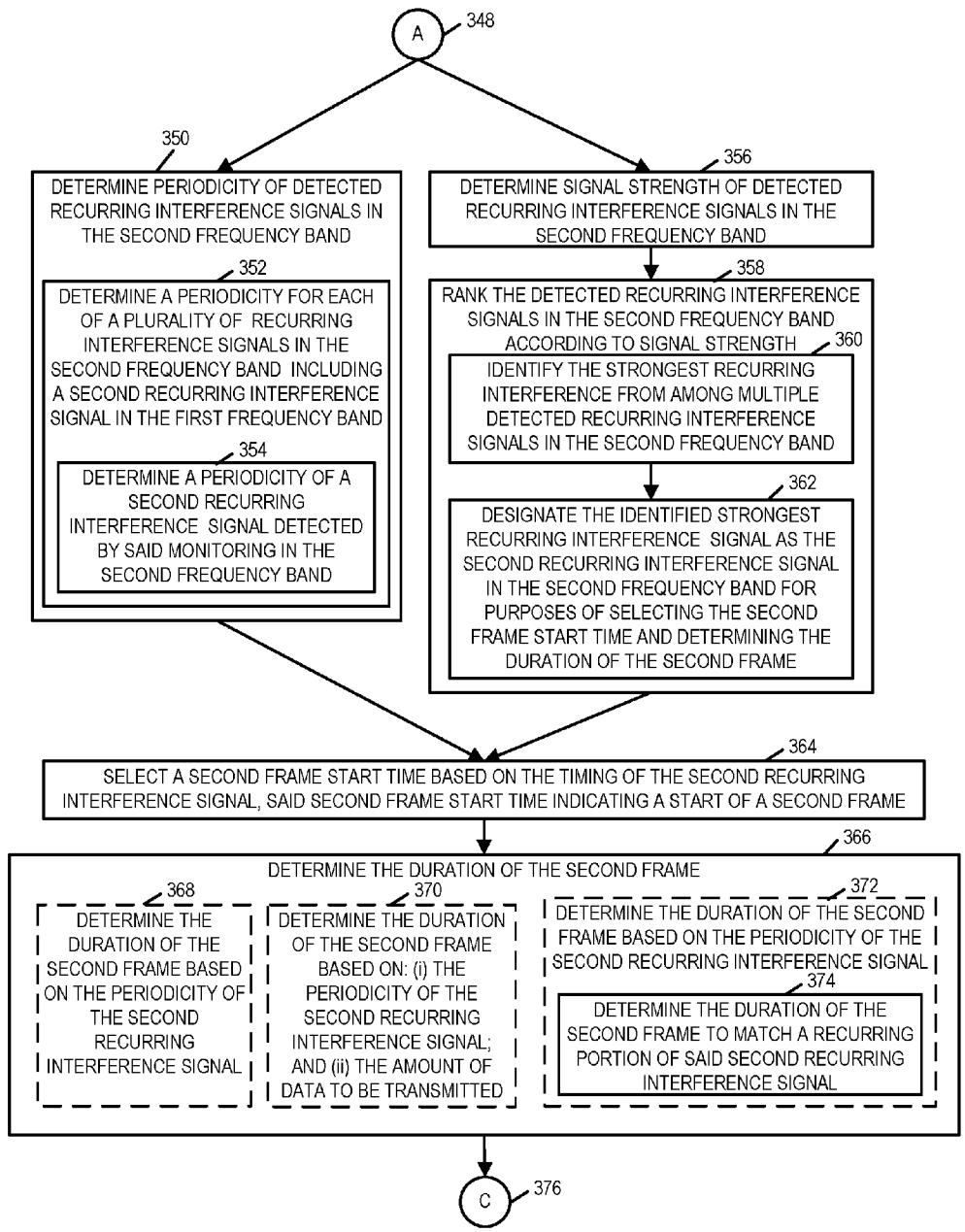
FIG. 3B is a second part of a flowchart of an exemplary method of operating a base station in accordance with various exemplary FDD embodiments.
Figure 3C:
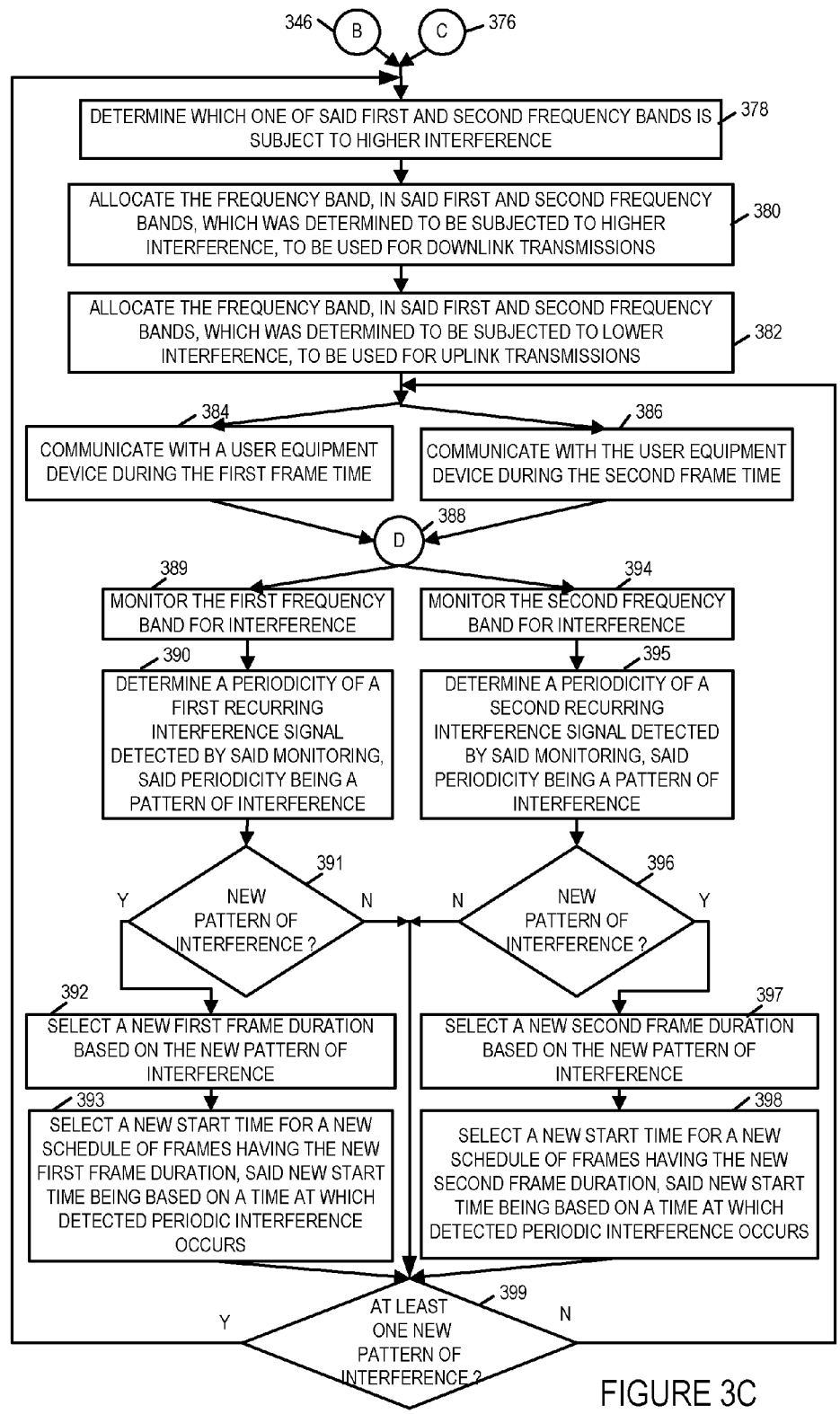
FIG. 3C is a third part of a flowchart of an exemplary method of operating a base station in accordance with various exemplary FDD embodiments.

FIG. 3, comprising the combination of FIG. 3A, FIG. 3B, and FIG. 3C, is a flowchart 300 of an exemplary method of operating a base station, e.g., system base station 1 102, in accordance with an exemplary embodiment. The exemplary method starts in step 302, in which the base station is powered on and initialized. Operation proceeds from step 302 to step 304.

In step 304 the base station monitors for interference. Step 304 includes step 306 and step 308. Steps 306 and 308 may be performed serially or in parallel. In step 306 the base station monitors a first frequency band for interference, and in step 308 the base station monitors a second frequency band for interference, said second frequency band being different from the first frequency band.

The monitoring of step 306 includes detecting a first recurring interference signal. In various embodiments, the first recurring interference signal is transmitted by a first interfering device, said first interfering device being one of a radio broadcast transmitter corresponding to a broadcast radio station, a television broadcast transmitter of a television station, a cellular network base station corresponding to a cellular network or a WiFi base station, said base station belonging to a network to which the first interfering device does not belong. In some embodiments, the first recurring interference signal is transmitted by a first interfering device, and the first interfering device is, e.g., a WiMAX BS, a microwave oven, or another source of radio interference.

Step 306 includes step 309 in which the base station detects multiple interference signals in the first frequency band, e.g., directly and/or from interference information received from one or more other devices. Step 309 includes step 310 in which the base station detects multiple recurring interference signals in the first frequency band. Step 310 includes one or both of steps 311 and 312. In step 311 the base station detects one or more recurring interference signals directly, e.g., with a recurring interference signal in the first frequency band being received via one of its wireless receivers. In step 312 the base station receives signals from one or more other devices, e.g., WT 1 110, additional interference monitoring device 1 128, and system base station 2 104, communicating interference information, e.g., interference information regarding the first frequency band.

The monitoring of step 308 includes detecting a second recurring interference signal. In various embodiments, the second recurring interference signal is transmitted by a second interfering device, said second interfering device being one of a radio broadcast transmitter corresponding to a broadcast radio station, a television broadcast transmitter of a television station, a cellular network base station corresponding to a cellular network or a WiFi base station, said base station belonging to a network to which the first interfering device does not belong. In some embodiments, the second recurring interference signal is transmitted by a second interfering device, and the second interfering device is, e.g., a WiMAX BS, a microwave oven, or another source of radio interference.

Step 308 includes step 313 in which the base station detects multiple interference signals in the second frequency band, e.g., directly and/or from interference information received from one or more other devices. Step 313 includes step 314 in which the base station detects multiple recurring interference signals in the second frequency band. Step 314 includes one or both of steps 315 and 316. In step 315 the base station detects one or more recurring interference signals directly, e.g., with a recurring interference signal in the second frequency band being received via one of its wireless receivers. In step 315 the base station receives signals from one or more other devices, e.g., WT 1 110, additional interference monitoring device 1 128, and system base station 2 104, communicating interference information, e.g., interference information regarding the second frequency band.

Returning to step 306, operation proceeds from step 306 to steps 318 and step 326. In step 318 the base station determines periodicity of detected recurring interference signals in the first frequency band. Step 318 includes step 322 in which the base station determines a periodicity for each of a plurality of recurring interference signals in the first frequency band including a first recurring interference signal in the first frequency band. Step 322 includes step 324 in which the base station determines a periodicity of a first recurring interference signal detected by said monitoring in the first frequency band. In step 326 the base station determines signal strength of detected recurring interference signals in the first frequency band. Operation proceeds from step 326 to step 328. In step 328 the base station ranks the detected recurring interference signals in the first frequency band according to signal strength. Step 328 includes steps 330 and 332. In step 330 the base station identifies the strongest recurring interference from among multiple detected recurring interference signals in the first frequency band. Operation proceeds from step 330 to step 332. In step 332 the base station designates the identified strongest recurring interference signal as the first recurring interference signal in the first frequency band for the purposes of selecting the first frame start time and determining the duration of the first frame. Operation proceeds from steps 318 and 328 to step 334.

In step 334 the base station selects a first frame start time based on the timing of the first recurring interference signal, said first frame start time indicating a start of a first frame. Operation proceeds from step 334 to step 336, in which the base station determines the duration of the first frame. In various embodiments, step 336 includes one of steps 338, 340 and 342. In step 338 the base station determines the duration of the first frame based on the periodicity of the first recurring interference signal. In step 340 the base station determines the duration of the first frame based on: i) the periodicity of the first recurring interference signal; and ii) the amount of data to be transmitted. In step 342 the base station determines the duration of the first frame based on the periodicity of the first recurring interference signal. Step 342 includes step 346 in which the base station determines the duration of the first frame to match a recurring portion of said first recurring interference signal. For example, the base station matches the first frame duration to the duration of a recurring signal portion of the first interference signal which may be a frame time or other periodic signal transmission time used by the interfering transmitter. In some embodiments, determining the duration of the first frame is based on one or more or all of: the periodicity of the first recurring interference signal, the amount of data to be transmitted, and identification of a recurring portion of said first recurring interference signal to match the duration of the first frame. Operation proceeds from step 336, via connecting node B 346 to step 378.

Returning to step 308, operation proceeds from step 308, via connecting node A 348, to steps 350 and step 356. In step 350 the base station determines periodicity of detected recurring interference signals in the second frequency band. Step 350 includes step 352 in which the base station determines a periodicity for each of a plurality of recurring interference signals in the second frequency band including a second recurring interference signal in the second frequency band. Step 352 includes step 354 in which the base station determines a periodicity of a second recurring interference signal detected by said monitoring in the second frequency band. In step 356 the base station determines signal strength of detected recurring interference signals in the second frequency band. Operation proceeds from step 356 to step 358. In step 358 the base station ranks the detected recurring interference signals in the second frequency band according to signal strength. Step 358 includes steps 360 and 362. In step 360 the base station identifies the strongest recurring interference from among multiple detected recurring interference signals in the second frequency band. Operation proceeds from step 360 to step 362. In step 362 the base station designates the identified strongest recurring interference signal as the second recurring interference signal in the second frequency band for the purposes of selecting the second frame start time and determining the duration of the second frame. Operation proceeds from steps 350 and 358 to step 364.

In step 364 the base station selects a second frame start time based on the timing of the second recurring interference signal, said second frame start time indicating a start of a second frame. Operation proceeds from step 364 to step 366, in which the base station determines the duration of the second frame. In various embodiments, step 366 includes one of steps 368, 370 and 372. In step 368 the base station determines the duration of the second frame based on the periodicity of the second recurring interference signal. In step 370 the base station determines the duration of the second frame based on: i) the periodicity of the second recurring interference signal; and ii) the amount of data to be transmitted. In step 372 the base station determines the duration of the second frame based on the periodicity of the second recurring interference signal. Step 372 includes step 374 in which the base station determines the duration of the second frame to match a recurring portion of said second recurring interference signal. For example, the base station matches the second frame duration to the duration of a recurring signal portion of the second interference signal which may be a frame time or other periodic signal transmission time used by the interfering transmitter. In some embodiments, determining the duration of the second frame is based on one or more or all of: the periodicity of the second recurring interference signal, the amount of data to be transmitted, and identification of a recurring portion of said second recurring interference signal to match the duration of the second frame. Operation proceeds from step 366, via connecting node C 376 to step 378.

In step 378 the base station determines which one of said first and second frequency bands is subject to higher interference. Operation proceeds from step 378 to step 380 in which the base station allocates the frequency band, in said first and second frequency bands, which was determined to be subjected to higher interference, to be used for downlink transmissions. Operation proceeds from step 380 to step 382. In step 382 the base station allocates the frequency band, in said first and second frequency bands, which was determined to be subjected to lower interference, to be used for uplink transmissions. In some embodiments, the bands are chosen such that the "local" (received) interference on both sides of the radio link (base station (BS) and wireless terminal (WT)) is minimal in the receive band; in other words, if the interference in band 1 is measured higher than in band 2 at the BS then use band 1 for transmission at the BS, especially if at the same time the interference measured at the WT is higher in band 2 than in band 1, so band 2 can be used for transmission (TX) at the WT. Operation proceeds from step 382 to steps 384 and 386.

In step 384 the base station communications with a user equipment device, e.g., WT 1 110, during the first frame time. In step 386 the base station communicates with the user equipment device during the second frame time. One of the communications of steps 384 and 386 is a downlink communication and the other one is an uplink communication, and the designation of which is downlink and which is uplink depends upon the allocations of step 380 and 382.

Operation proceeds from steps 384 and 386, via connecting node D 388, to steps 389 and 394. In step 389 the base station monitors the first frequency band for interference. The monitoring of step 389 may, and sometimes does, detect a new, e.g., different, first recurring interference signal. Operation proceeds from step 389 to step 390 in which the base station determines a periodicity of the first recurring interference signal detected by the monitoring of step 389, said periodicity being a pattern of interference. Operation proceeds from step 390 to step 391, in which the base station determines whether or not there is a new pattern of interference based on the determination of step 390. If there is not a new pattern of interference, then operation proceeds from step 391 to step 399. However, if the base station detects a new pattern of interference, then operation proceeds from step 391 to step 392 in which the base station, in response to a new pattern of interference, selects a new first frame duration based on the new pattern of interference. Operation proceeds from step 392 to step 393 in which the base station selects a new start time for a new schedule of frames having the new first frame duration, said new start time being based on a time at which detected periodic interference occurs. In some embodiments, if the radio link is transmitting FDD in frame periods, then at each end the transmit timing is chosen to coincide with the local interference and periods of low interference are used for reception in that band. Operation proceeds from step 393 to step 399.

Returning to step 394, in step 394 the base station monitors the second frequency band for interference. The monitoring of step 394 may, and sometimes does, detect a new, e.g., a different, second recurring interference signal. Operation proceeds from step 394 to step 395 in which the base station determines a periodicity of the second recurring interference signal detected by the monitoring of step 394, said periodicity being a pattern of interference. Operation proceeds from step 395 to step 396, in which the base station determines whether or not there is a new pattern of interference based on the determination of step 395. If there is not a new pattern of interference, then operation proceeds from step 396 to step 399. However, if the base station detects a new pattern of interference, then operation proceeds from step 396 to step 397 in which the base station, in response to a new pattern of interference, selects a new second frame duration based on the new pattern of interference. Operation proceeds from step 397 to step 398 in which the base station selects a new start time for a new schedule of frames having the new second frame duration, said new start time being based on a time at which detected periodic interference occurs. In some embodiments, if the radio link is transmitting FDD in frame periods, then at each end the transmit timing is chosen to coincide with the local interference and periods of low interference are used for reception in that band. Operation proceeds from step 398 to step 399.

In step 399, the base station determines whether or not at least one new pattern of interference has been detected based on the determinations of steps 391 and 396. If there is not at least one new pattern of interference detected, then operation proceeds from step 399 to steps 384 and 386, in which the base station continues to use the first frequency band and second frequency band to communicate with the user equipment device without making changes to the frame structure. However, if the base station detects at least one new pattern of interference, then operation proceeds from step 399 to step 378 in which the base station, in response to a new pattern of interference, determines which one of said first and second frequency bands is subject to higher interference based on current information. Subsequently the base station reallocates the frequency bands in steps 380 and 382 based on the determination of step 378, and communicates with the user device in steps 384 and 386, in accordance with the allocations of step 380 and 382.

Figure 4:
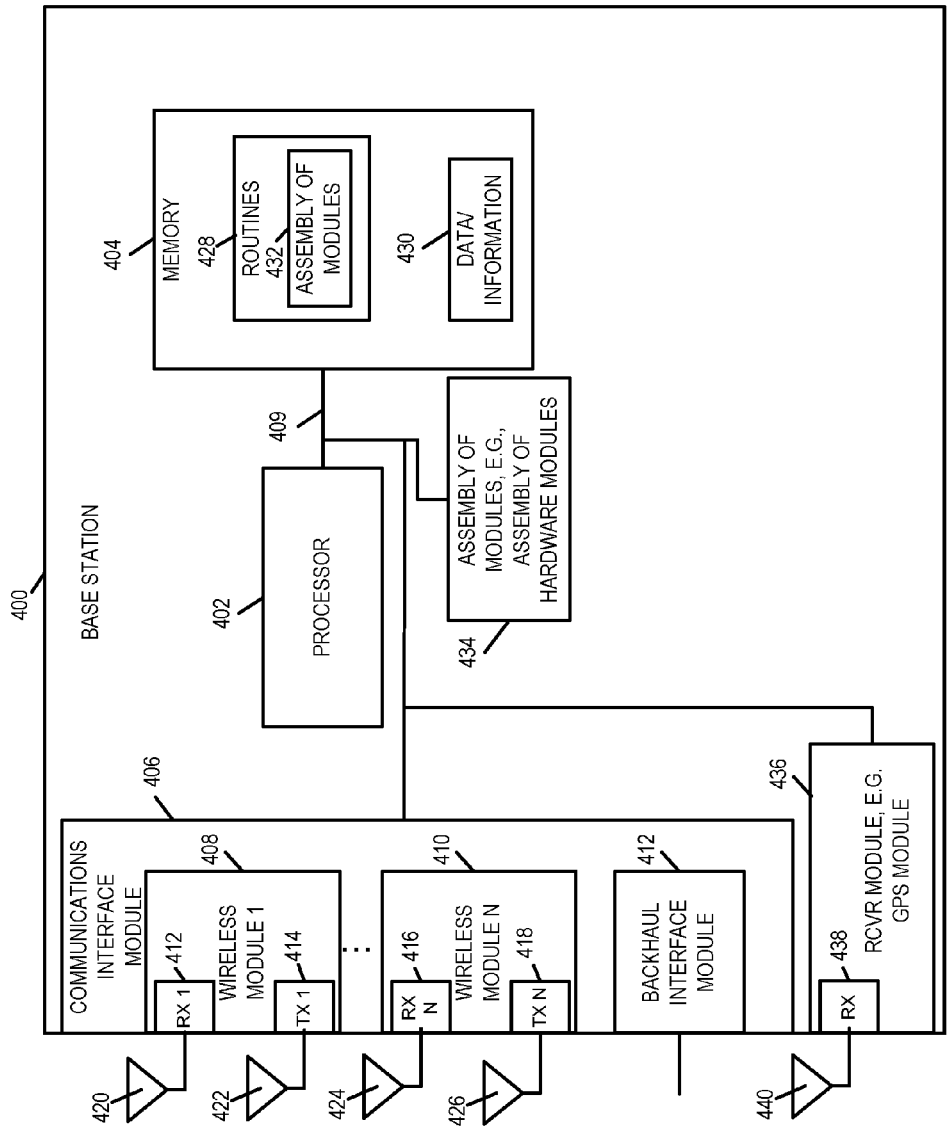
FIG. 4 is a drawing of an exemplary base station in accordance with an exemplary embodiment.

FIG. 4 is a drawing of an exemplary base station 400 in accordance with an exemplary embodiment. Exemplary base station 400 is, e.g., one of the system base stations of FIG. 1, e.g., system base station 1 102, of FIG. 1, and/or a base station implementing steps of the method flowchart 200 of FIG. 2 and/or the method of flowchart 300 of FIG. 3.

Base station 400 includes a processor 402, e.g., a CPU, memory 404, and an assembly of modules 434, e.g., an assembly of hardware modules, a communications interface module 406, and a receiver module 436 configured to receive timing synchronization signals, e.g., a GPS module, coupled together via a bus 409 over which the various elements may exchange data and information.

Communications interface module 406 includes a plurality of wireless communications modules (wireless module 1 408, . . . , wireless module N 410), and a backhaul interface module 412. Wireless module 1 408 includes a wireless receiver, RX 1 412, coupled to receive antenna 420, and a wireless transmitter, TX 1 414, coupled to transmit antenna 422. Wireless module N 410 includes a wireless receiver, RX N 416, coupled to receive antenna 424, and a wireless transmitter, TX N 418, coupled to transmit antenna 426. Receiver module 436, e.g., a GPS module, includes a receiver 438, e.g., a GPS receiver, couple to receive antenna 440.

In various embodiments, the different wireless modules, can be, and sometimes are, tuned to different frequency bands, e.g., allowing for concurrent interference monitoring of different frequency bands. Interference signals, e.g., recurring interference signals, may be received directed by any of the wireless receives (RX 1 412, . . . , RX N 416). Interference information from other devices may be received by any of wireless receives (RX 1 412, . . . , RX N 416) and/or a receiver included in backhaul interface module 412.

Memory 404 includes routines 428 and data/information 430. Routines 428 includes an assembly of modules 432. Data/information 430 includes frame information, e.g., including frame start time and frame duration time, which have been determined based on detected interference.

Figure 5:
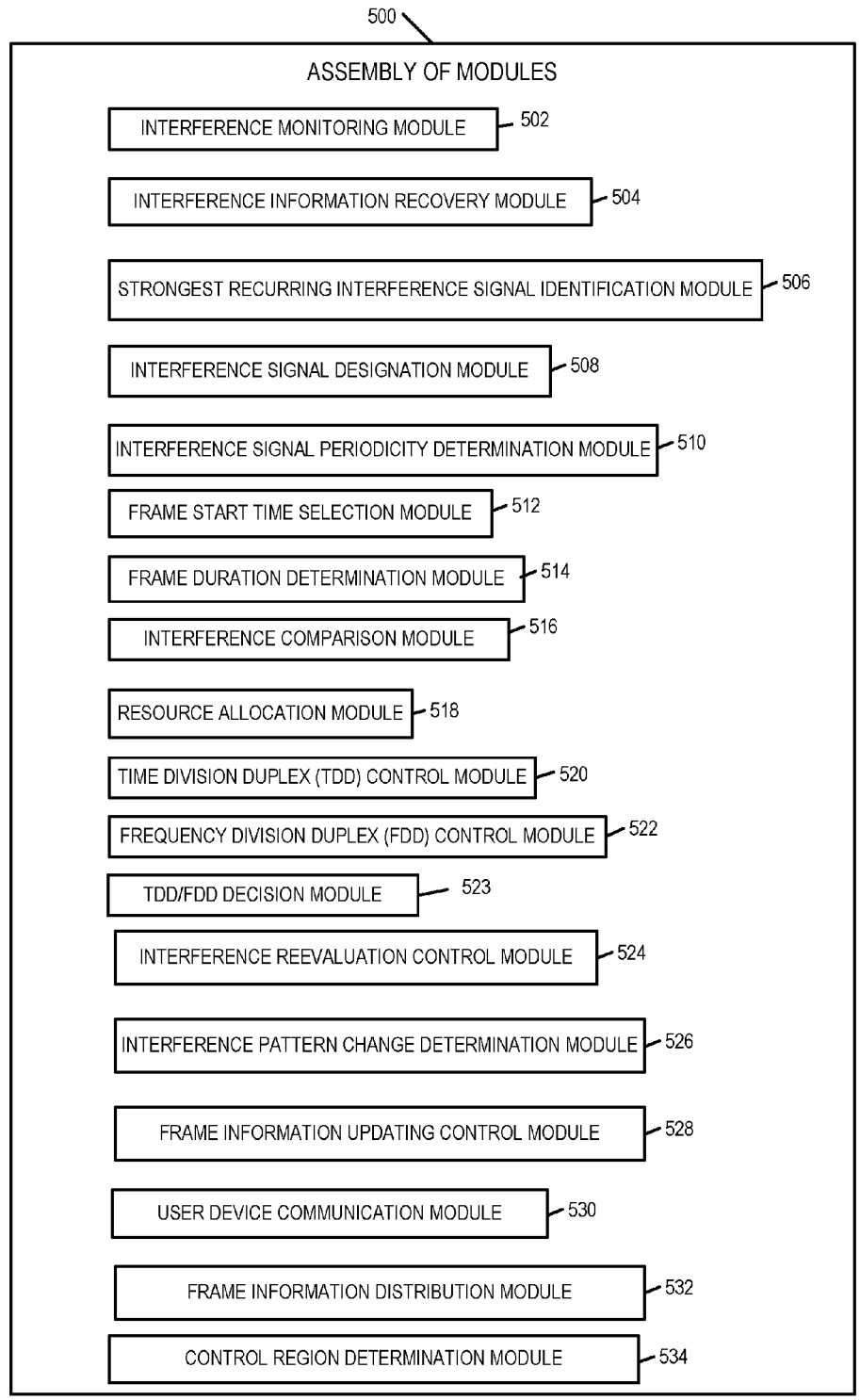
FIG. 5 is a drawing of an exemplary assembly of modules which may be included in a base station accordance with an exemplary embodiment.

FIG. 5 is a drawing of an assembly of modules 500 which may be included in an exemplary base station, e.g., base station 102 of FIG. 1 or base station 400 of FIG. 4 or a base station implementing a method in accordance with flowchart 200 of FIG. 2 or flowchart 300 of FIG. 3, in accordance with an exemplary embodiment. Assembly of modules 500 which can, and in some embodiments is, used in the base station 400. The modules in the assembly of modules 500 can, and in some embodiments are, implemented fully in hardware within the processor 402, e.g., as individual circuits. The modules in the assembly of modules 500 can, and in some embodiments are, implemented fully in hardware within the assembly of modules 434, e.g., as individual circuits corresponding to the different modules. In other embodiments some of the modules are implemented, e.g., as circuits, within the processor 402 with other modules being implemented, e.g., as circuits within assembly of modules 434, external to and coupled to the processor 402. As should be appreciated the level of integration of modules on the processor and/or with some modules being external to the processor may be one of design choice. Alternatively, rather than being implemented as circuits, all or some of the modules may be implemented in software and stored in the memory 404 of the base station 400, with the modules controlling operation of base station 400 to implement the functions corresponding to the modules when the modules are executed by a processor, e.g., processor 402. In some such embodiments, the assembly of modules 500 is included in the memory 404 as assembly of modules 432. In still other embodiments, various modules in assembly of modules 500 are implemented as a combination of hardware and software, e.g., with another circuit external to the processor providing input to the processor 402 which then under software control operates to perform a portion of a module's function. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor 402 to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the base station 400 or elements therein such as the processor 402, to perform the functions of corresponding steps illustrated in the method of one or more of the flowcharts of FIGS. 2 and 3. Thus the assembly of modules 500 includes various modules that perform functions of corresponding steps of one or more of FIGS. 2-3.

Assembly of modules 500 includes an interference monitoring module 502; an interference information recovery module 504; a strongest recurring interference signal identification module 506; an interference signal designation module 508; an interference signal periodicity determination module 510; a frame start time selection module 512; a frame duration determination module 514; an interference comparison module 516; a resource allocation module 518; a time division duplex control module 520; a frequency division duplex control module 522; a TDD/FDD decision module 523; an interference reevaluation module 524; an interference pattern change determination module 526; a frame information updating control module 528; a user device communication module 530; a frame information distribution module 532; and a control region determination module 534.

Interference monitoring module 502 is configured to monitor a first frequency band for interference. In various embodiments, the monitoring by module 502 in the first frequency band detects a first recurring interference signal.

Interference information recovery module 504 is configured to received signals from one or more other devices, e.g., WT 1 110, additional interference monitoring device 1 128, base station 2 104, etc., communicating interference information. In various embodiments, the interference information recovery module correlates received interference information with interference collection device position information, e.g., based on GPS information and/or known location information corresponding to the interference information collection device.

In some embodiments, the interference monitoring module 502 detects multiple interference signals in the first frequency band; and the strongest recurring interference signals identification module is configured to identify the strongest recurring interference signal from among the multiple detected interference signals. Interference signals designation module is configured to designate the identified strongest recurring interference signal as said first recurring interference signal for the purposes of selecting a first frame start time and the duration of the first frame.

Interference signal periodicity determination module 510 is configured to determine a periodicity of a first recurring interference signal. Frame start time selection module 512 is configured to select a first frame start time based on the timing of the first recurring interference signal, said first frame start time indicating a start of a first frame. Frame duration determination module 514 is configured to determine the duration of the first frame based on the periodicity of the first recurring interference signal. In various embodiments, the frame duration determination module 514 is further configured to determine the duration of the first frame based on the amount of data to be transmitted. In some embodiments, the frame duration determination module determines the duration of the first frame to match a duration of a recurring portion of said first recurring interference signals, e.g., to match the first frame duration to the duration of a recurring signal portion of the first recurring interference signal which may be a frame time or other periodic signal transmission time used for the interfering transmitter.

In some embodiments, e.g., some TDD embodiments, resource allocation module 518 is configured to allocate a first set of time periods for downlink frame transmissions in said first frequency band corresponding to time periods of said first recurring interference signal and is configured to allocate a second set of time periods for uplink frame transmissions in said first frequency band corresponding to time periods of lower interference than the time periods of said allocated first set of time periods. Thus, allocation module 518 allocates uplink and downlink frame times based on the detected interference in the first frequency band. Downlink time frames are allocated to the higher interference periods since the base station is not limited in terms of supplied power since it normally has a connection to a power line and thus can support high transmission downlink power levels. Time slots corresponding to the low periods of interference are allocated to uplink transmissions since the transmission by mobile UE devices may be limited in terms of available power since the UEs are, at least in some cases, battery powered devices.

Time division duplex control module 520 is configured to control the base station to use the first frequency band in a time division duplex (TDD) manner. Frequency divisions duplex (FDD) control module 522 is configured to control the base station to use a first frequency band and a second frequency band in a TDD manner. TDD/FDD decision module 523 is configured to decide whether to use TDD or FDD as a function of one or more of all of: detected interference, UE device capability information, interfering device frame structure implementation, e.g., whether an interfering base station is using TDD or FDD.

Interference reevaluation module 524, in some embodiments, e.g., some TDD embodiments, is configured to control the interference monitoring module 502 to repeat the monitoring of the first frequency band for interference and control the interference signal periodicity determination module 510 to determine a periodicity of a first recurring interference signal detect by said repeat monitoring of the first frequency band, said periodicity being a pattern of interference.

Interference pattern change determination module 526, in some embodiments, e.g. some TDD embodiments, is configured to determine whether or not the interference pattern has changed. The frame information updating control module 528 is configured to control the frame duration determination module 514 to determine a new frame duration based on the new pattern of interference, in response to the detected new pattern of interference. Frame information updating control module 528 is further configured to control the frame start time selection module 512 to select a new start time for a new schedule of frame having the new frame duration, said new start time being based on a time at which detected periodic interference occurs.

User device communications module 530 is configured to communicate with a user equipment device during a first frame time.

In various embodiments, e.g. some FDD embodiments, interference monitoring module 502 is further configured to monitor a second frequency band for interference, said second frequency band being different from the first frequency band. In some such embodiments, the interference signal periodicity determination module 510 is further configured to determine a periodicity of a second recurring interference signal detected by the monitoring in the second frequency band, and the frame start time selection module 512 is further configured to select a second frame start time based on the time of the second recurring interference signal, said second start time indicating a start of second frame. In some such embodiments, the UE device communications module 530 is further configured to communicate with a user equipment device during said second time frame.

Interference comparison module 516 is configured to determine which one of said first and second frequency bands is subject to higher interference. In some embodiments, e.g., some FDD embodiments, resource allocation module 518 is configured to allocate the frequency band in the first and second frequency bands subject to higher interference to be used for downlink transmission and allocates the frequency band, in the first and second frequency band, subject to lower interference to be used for uplink transmissions.

In some embodiments, the interference monitoring module 502 detects a first set of multiple interference signals while monitoring the first frequency band for interference. In various embodiments, the strongest recurring interference signal identification module 506 is configured to identify the strongest recurring interference signal from among the detected interference signals in the first set; and the interference signal designation module 508 is configured to designate the identified strongest recurring interference signal in the first set as said first recurring interference signal for the purposes s of selecting the first frame start time and determining the duration of said first frame.

In some embodiments, the interference monitoring module 502 detects a second set of multiple interference signals while monitoring the second frequency band for interference. In various embodiments, the strongest recurring interference signal identification module 506 is configured to identify the strongest recurring interference signal from among the detected interference signals in the second set; and the interference signal designation module 508 is configured to designate the identified strongest recurring interference signal in the second set as said second recurring interference signal for the purposes s of selecting the second frame start time and determining the duration of said second frame.

In some embodiments, interference reevaluation control module 524 is configured to: control the interference monitoring module 502 to repeat the monitoring of the first frequency band for interference; control the interference signal periodicity determination module 510 to determine a periodicity of a first recurring interference signal detected by said repeat monitoring of the first frequency band, said periodicity being a pattern of interference corresponding to the first frequency band; control the interference monitoring module 502 to repeat the monitoring of the second frequency band for interference; and control the interference signal periodicity determination module 510 to determine a periodicity of a second recurring interference signal detected by said repeat monitoring of the second frequency band, said periodicity being a pattern of interference corresponding to the second frequency band.

In some embodiments, interference pattern change determination module 526 is configured to determine whether or not the interference pattern corresponding to the first frequency band has changed, and a frame information updating control module 528 is configured to control the frame duration selection module to select a new first frame duration based on the new pattern of interference, in response to a new pattern of interference corresponding to the first frequency band. In some such embodiments, said frame information updating control module 528 is further configured to control the frame start time selection module 512 to select a new first frame start time for a new schedule of frames having the new frame duration, said new start time being based on a time at which detected periodic interference occurs.

In some such embodiments, said interference pattern change determination module 526 is further configured to determine whether or not the interference pattern corresponding to the second frequency band has changed; and said the frame information updating control module 528 is further configured to control the frame duration selection module to select a new second frame duration based on the new pattern of interference, in response to a new pattern of interference corresponding to the second frequency band. In some such embodiments, the frame information updating control module 528 is further configured to control the frame start time selection module 512 to select a new second frame start time for a new schedule of frames having the new frame duration, said new start time being based on a time at which detected periodic interference occurs.

Frame information distribution module 532 is configured to communicate frame information, e.g., including frame start timing information and/or frame duration information to devices in the same communication network as the base station including assembly of module 500. In various embodiments, frame information is distributed by module 532 in response to detected changes in interference patterns of detected recurring interference signals, e.g., with dynamic updates being performed. Frame information distribution module 532, in some embodiments, also communicates whether the implementation is to be TDD or FDD.

Control region determination module 534 determines the extend of control over framing information that is to be exerted by the base station including assembly of modules 500 in the communications network. In some embodiments, in response to detected recurring interference the base station including assembly of modules 500 decides whether to control the entire communications network or a regional portion of the communications network. In some embodiments, different base station in the communications network independently exert control over different regions.

In some embodiments, the first recurring interference signal is transmitted by a first interfering device, said first interfering device being one of a radio broadcast transmitter corresponding to a broadcast radio station, a television broadcast transmitter of a television station, a cellular network base station corresponding to a cellular network or a WiFi base station, said base station belonging to a network to which the first interfering device does not belong. In some such embodiments, the second recurring interference signal is transmitted by a second interfering device, said second interfering device being one of a radio broadcast transmitter corresponding to a broadcast radio station, a television broadcast transmitter of a television station, a cellular network base station corresponding to a cellular network or a WiFi base station, said base station belonging to a network to which the first interfering device does not belong. In some embodiments, the first recurring interference signal is transmitted by a first interfering device, and the first interfering device is, e.g., a WiMAX BS, a microwave oven, or another source of radio interference. In some embodiments, the second recurring interference signal is transmitted by a second interfering device, and the second interfering device is, e.g., a WiMAX BS, a microwave oven, or another source of radio interference.

Figure 6:
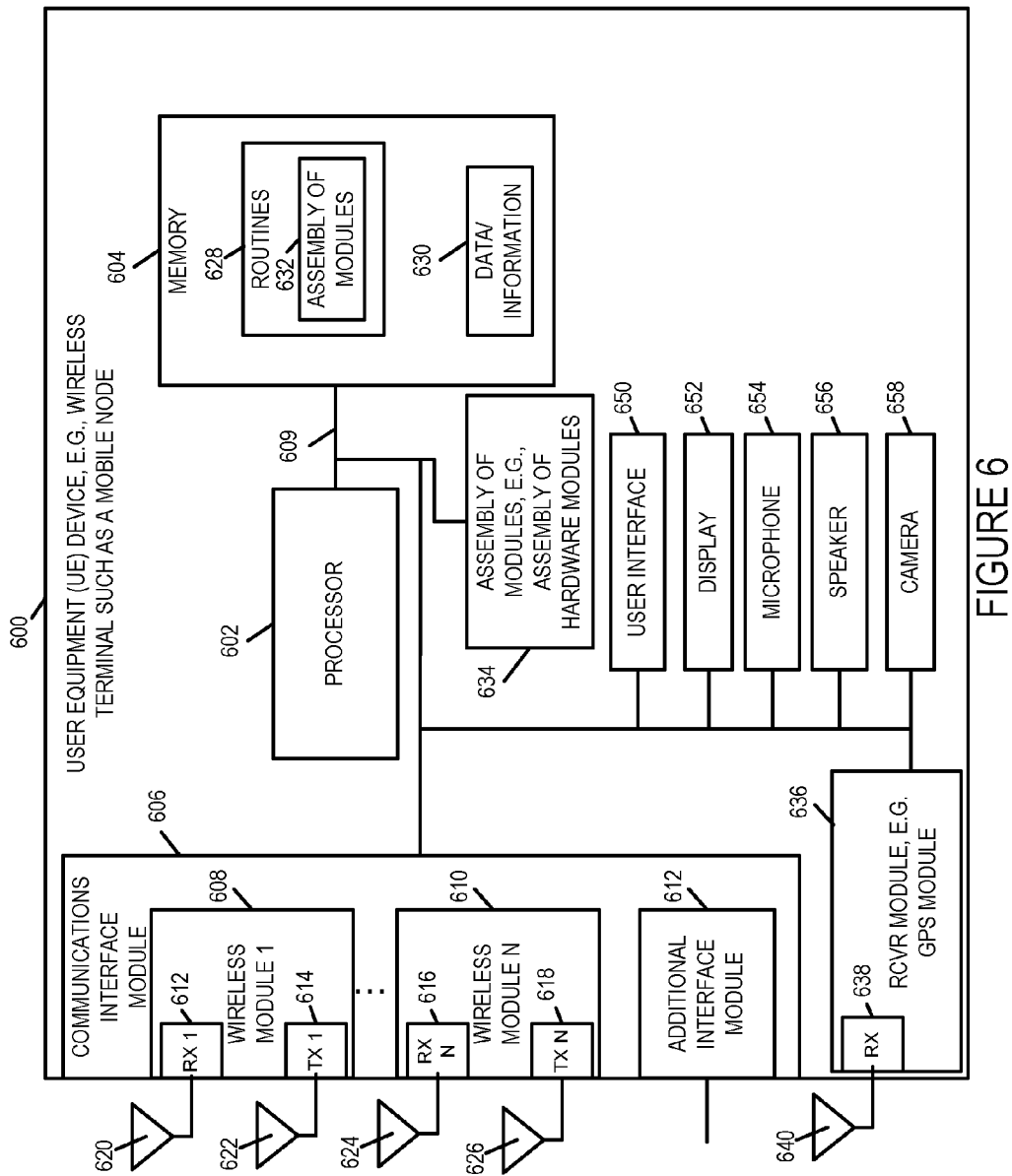
FIG. 6 is a drawing of an exemplary user equipment (UE) device in accordance with an exemplary embodiment.

FIG. 6 is a drawing of an exemplary user equipment (UE) device 600, e.g., a wireless terminal such as a mobile node, in accordance with an exemplary embodiment. Exemplary UE device 600 is, e.g., one of the wireless terminals of FIG. 1, e.g., wireless terminal 1 110, of FIG. 1, and/or a UE device implementing steps described with regard to the method flowchart 200 of FIG. 2 and/or the method of flowchart 300 of FIG. 3.

UE device 600 includes a processor 602, e.g., a CPU, memory 604, and an assembly of modules 634, e.g., an assembly of hardware modules, a communications interface module 606, a receiver module 636 configured to receive timing synchronization signals, e.g., a GPS module, a user interface 650, e.g., switches, buttons, keypad, touch-screen interface, etc., a display 652, a microphone 654, a speaker 656, and a camera 658, coupled together via a bus 609 over which the various elements may exchange data and information.

Communications interface module 606 includes a plurality of wireless communications modules (wireless module 1 608, . . . , wireless module N 610), and an additional interface module 612. Wireless module 1 608 includes a wireless receiver, RX 1 612, coupled to receive antenna 620, and a wireless transmitter, TX 1 614, coupled to transmit antenna 622. Wireless module N 610 includes a wireless receiver, RX N 616, coupled to receive antenna 624, and a wireless transmitter, TX N 618, coupled to transmit antenna 626. Receiver module 636, e.g., a GPS module, includes a receiver 638, e.g., a GPS receiver, couple to receive antenna 640.

In various embodiments, the different wireless modules, can be, and sometimes are, tuned to different frequency bands, e.g., allowing for concurrent interference monitoring of different frequency bands. In various embodiments, interference signals, e.g., recurring interference signals, are monitored for and detected directly via any of the wireless receives (TX 1 612, . . . , RX N616). Interference information signals are generated and transmitted, e.g., via a wireless transmitter (TX 1 614, . . . , TX N 618) to the base station, information in the interference information signals being based on the directly detected interference, and optionally including device location information.

Memory 604 includes routines 628 and data/information 630. Routines 628 includes an assembly of modules 632. Data/information 630 includes frame structure information, e.g., including current frame duration and frame start time information to be used by UE 600 when communicating with a base station, the frame structure information being communicated from a base station and having been determined based on detected interference.

Figure 7:
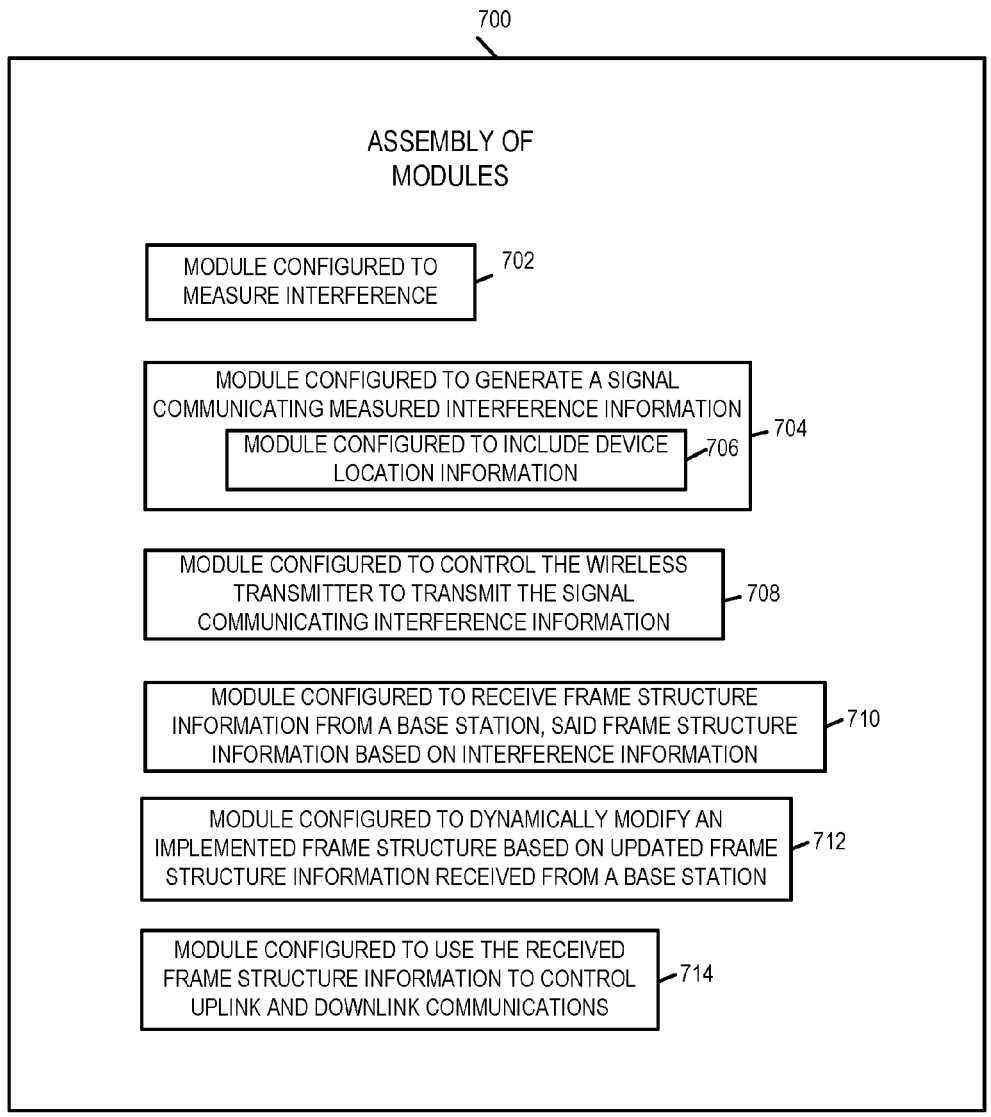
FIG. 7 is a drawing of an exemplary assembly of modules which may be included in an exemplary UE device accordance with an exemplary embodiment.

FIG. 7 is a drawing of an assembly of modules 700 which may be included in an exemplary UE device, e.g., wireless terminal 110 of FIG. 1 or a UE device implementing steps or operations described with respect to flowchart 200 of FIG. 2 or flowchart 300 of FIG. 3, in accordance with an exemplary embodiment. Assembly of modules 700 which can, and in some embodiments is, used in the UE device 600. The modules in the assembly of modules 700 can, and in some embodiments are, implemented fully in hardware within the processor 692, e.g., as individual circuits. The modules in the assembly of modules 700 can, and in some embodiments are, implemented fully in hardware within the assembly of modules 634, e.g., as individual circuits corresponding to the different modules. In other embodiments some of the modules are implemented, e.g., as circuits, within the processor 692 with other modules being implemented, e.g., as circuits within assembly of modules 634, external to and coupled to the processor 692. As should be appreciated the level of integration of modules on the processor and/or with some modules being external to the processor may be one of design choice. Alternatively, rather than being implemented as circuits, all or some of the modules may be implemented in software and stored in the memory 604 of the UE device 600, with the modules controlling operation of UE device 600 to implement the functions corresponding to the modules when the modules are executed by a processor, e.g., processor 602. In some such embodiments, the assembly of modules 700 is included in the memory 604 as assembly of modules 632. In still other embodiments, various modules in assembly of modules 700 are implemented as a combination of hardware and software, e.g., with another circuit external to the processor providing input to the processor 602 which then under software control operates to perform a portion of a module's function. While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the UE device 600 or elements therein such as the processor 602, to perform the functions of corresponding steps described in the method of one or more of the flowcharts of FIGS. 2 and 3. Thus the assembly of modules 700 includes various modules that perform functions of corresponding steps of one or more of FIGS. 2-3.

Assembly of modules 700 includes a module 702 configured measure interference, and a module 704 configured to generate a signal communicating measured interference information. Module 704 includes a module 706 configured to include device location information, e.g., device 600 GPS location information, in the signal communicating measured interference information. Assembly of module 700 further includes a module 708 configured to control a wireless transmitter to transmit the signal communicating the interference information to a base station, a module 710 configured to receive frame structure information from a base station, said frame structure information based on interference information, a module 712 configured to dynamically modify an implemented frame structure being used by the UE device, based on updated frame structure information received from the base station, and a module 714 configured to use the received frame structure information to control uplink and downlink communications with the base station.

In some embodiment wireless terminals, e.g, user devices, monitor for interference and report to the base station on the detected interference. In some such embodiments the frequency band monitored by the wireless terminals is a second frequency band used for uplink communication while a first frequency band is used for downlink communication. The base station may alternatively directly monitor the second frequency band. This at least some embodiments include monitoring a second frequency band for interference or receiving interference information from one or more wireless terminals regarding the secondary frequency band where the second frequency band being different from said first frequency band. In at least some such embodiments the base station acting as a control node, or another control node in the system, determines a periodicity of a recurring interference signal in the second frequency band; and selects a frame start time to be used for uplink signaling based on the timing of said recurring interference signal, where the frame start time indicates a start of an uplink frame. In addition to controlling the frame start time and/or frame duration in the uplink based on detected interference, in some embodiments the base station and/or other control device, allocates periods to individual wireless terminals to be used for uplink transmissions. The allocated periods are referenced in some embodiments to the determine uplink frame start time. In some embodiments the control device, e.g., base station, communicates with a user equipment device during the second frame time, e.g., receives an uplink signal, from the wireless terminal during the uplink time period allocated to the wireless terminal. In some embodiments the allocated uplink time period is selected by the control device, e.g., base station, to be a time period when the wireless terminal will be subject to low interference.

The control of the frame start time, frame duration and allocation of resources to wireless terminals for uplink transmissions based on reported or detected recurring interference in the uplink frequency band can be in addition to the frame start time, frame duration and allocation of downlink resources for communication to wireless terminals which occurs in some embodiments based on detected or reported interference in the downlink frequency band.

Methods, apparatus and/or features can be implemented using software, hardware and/or a combination of software and hardware. Various embodiments are directed to apparatus, e.g., communications device such as base station and/or a user equipment (UE). Various embodiments are directed to communications systems. Various embodiments are also directed to methods, e.g., a method of operating a communications device such as a base station and/or a user equipment (UE) device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, determining a periodicity of a recurring interference signal, selecting a frame start time, communicating with a UE device, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a base station, including a processor configured to implement one, multiple or all of the steps of one or more methods of the invention.

Logic in a processor, control device and/or base station or wireless terminal is used in some embodiments to implement one or more features or steps described in the present application.

In some embodiments, the processor or processors, e.g., CPUs, of one or more devices, e.g., of the communications device, e.g., a base station is configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device with a processor which includes a module corresponding to each of the steps of the various described methods performed by the device in which the processor is included. In some but not all embodiments an apparatus, e.g., a communications device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple network nodes or components including, for example, multiple base stations. In various embodiments the network nodes or entities are implemented as hardware, e.g., separate devices each including a communications interface for sending and/or receiving signals communicating data or other information, one or more processors and memory. In some embodiments the memory includes data and/or control routines. In at least some embodiments the one or more processors operate under control instructions in the control routine or routines stored in the node's memory. Thus, when executed by the processor, the instructions in the node or other network entity to perform the functions in accordance with one or more of the methods described herein. In some embodiments the processor or processors of individual nodes are special purposed processors, e.g., ASICs, with hardware circuitry which is configured to implement or control the node or network entity in which the special purpose processor is located to implement one or more steps in accordance with a method or methods described herein. In at least some embodiments, circuits and/or other hardware are used to implement the node or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communications device, the method comprising:
monitoring a second frequency band for interference or receiving interference information from wireless terminals regarding the second frequency band, said second frequency band being different from a first frequency band, wherein said second frequency band is an uplink communications frequency band;
determining a periodicity of a first recurring interference signal;
determining a periodicity of a second recurring interference signal in said second frequency band;
selecting a first frame start time based on the timing of said first recurring interference signal, said first frame start time indicating a start of a first frame;
selecting a second frame start time based on the timing of said second recurring interference signal, said second frame start time indicating a start of a second frame;
allocating a time period, defined based on said second frame start time, to a user equipment device for uplink transmissions by said user equipment device, said allocated time period being a time period during which said user equipment device is subjected to low local interference;
communicating with a user equipment device during said first frame time; and
communicating with a user equipment device during said second frame time, wherein communicating with a user equipment device during said second frame time includes receiving an uplink signal.

2. The method of claim 1, further comprising:
monitoring said first frequency band for interference, said monitoring detecting said first recurring interference signal.

3. The method of claim 1, further comprising:
receiving signals from one or more other devices communicating interference information.

4. The method of claim 1, further comprising:
determining the duration of said first frame based on the periodicity of said first recurring interference signal.

5. The method of claim 4, wherein the duration is further determined based on the amount of data to be transmitted.

6. The method of claim 4, wherein determining the duration of said first frame includes determining the duration of said first frame to match a duration of a recurring portion of said first recurring interference signal.

7. The method of claim 2, wherein said monitoring the first frequency band for interference detects multiple interference signals, the method further comprising:
identifying the strongest recurring interference signal from among said multiple detected interference signals; and
using said identified strongest interference signal as said first recurring interference signal for purposes of selecting said first frame start time and determining the duration of said first frame.

8. The method of claim 7, further comprising:
allocating a first set of time periods for downlink frame transmissions in said first frequency band corresponding to time periods of said first recurring interference signal; and
allocating a second set of time periods for uplink frame transmissions in said first frequency band corresponding to time periods of lower interference than the time periods of said allocated first set of time periods.

9. The method of claim 8, wherein said first recurring interference signal is transmitted by a first interfering device, said first interfering device being one of a radio broadcast transmitter corresponding to a broadcast radio station, a television broadcast transmitter of a television station, a cellular network base station corresponding to a cellular network or a WiFi base station.

10. The method of claim 9, further comprising:
repeating said steps of: i) monitoring a first frequency band for interference; and ii) determining a periodicity of a first recurring interference signal detected by said monitoring, said periodicity being a pattern of interference; and
in response to a new pattern of interference, selecting a new frame duration based on the new pattern of interference.

11. The communications method of claim 10, further comprising:
selecting a new start time for a new schedule of frames having the new frame duration, said new start time being based on a time at which detected periodic interference occurs.

12. A method of operating a communications device, the method comprising:
monitoring a second frequency band for interference or receiving interference information from wireless terminals regarding the second frequency band, said second frequency band being different from a first frequency band;
determining which one of said first and second frequency bands is subject to higher interference;
allocating the frequency band, in said first and second frequency bands subject to higher interference to be used for downlink transmissions;
allocating the frequency band, in said first and second frequency bands subject to lower interference to be used for uplink transmissions;
determining a periodicity of a first recurring interference signal;
determining a periodicity of a second recurring interference signal in said second frequency band;
selecting a first frame start time based on the timing of said first recurring interference signal, said first frame start time indicating a start of a first frame;
selecting a second frame start time based on the timing of said second recurring interference signal, said second frame start time indicating a start of a second frame;
communicating with a user equipment device during said first frame time; and
communicating with a user equipment device during said second frame time.

13. The method of claim 12, further comprising:
monitoring a first frequency band for interference, wherein said monitoring the first frequency band for interference detects a first set of multiple interference signals;
identifying the strongest recurring interference signal from among said multiple detected interference signals in said first set; and
using said identified strongest interference signal in said first set as said first recurring interference signal for purposes of selecting said first frame start time and determining the duration of said first frame.

14. A communications device comprising:
an interference monitoring module configured to monitor a second frequency band for interference or receiving interference information from wireless terminals regarding the second frequency band, said second frequency band being different from a first frequency band, wherein said second frequency band is an uplink communications frequency band;
an interference signal periodicity determination module configured to: i) determine a periodicity of a first recurring interference signal and ii) determine a periodicity of a second recurring interference signal in said second frequency band;
a frame start time selection module configured to: i) select a first frame start time based on the timing of said first recurring interference signal, said first frame start time indicating a start of a first frame, and ii) select a second frame start time based on the timing of said second recurring interference signal, said second frame start time indicating a start of a second frame;
a resource allocation module configured to allocate a time period, defined based on said second frame start time, to a user equipment device for uplink transmissions by said user equipment device, said allocated time period being a time period during which said user equipment device is subjected to low local interference; and
a user device communication module configured to: i) communicate with a user equipment device during said first frame time and ii) communicate with a user equipment device during said second frame time, wherein communicating with a user equipment device during said second frame time includes receiving an uplink signal.

15. The communications device of claim 14, further comprising:
a frame duration determination module configured to determine the duration of said first frame based on the periodicity of said first recurring interference signal.

16. The communications device of claim 15, wherein the frame duration determination module determines the duration of said first frame to match a duration of a recurring portion of said first recurring interference signal.

17. The communications device of claim 16, wherein the interference monitoring module detects multiple interference signals in the first frequency band, the communications device further comprising:

a strongest recurring interference signal identification module configured to identify the strongest recurring interference signal from among said multiple detected interference signals; and
an interference signal designation module configured to designate said identified strongest interference signal as said first recurring interference signal for purposes of selecting said first frame start time and determining the duration of said first frame;
a resource allocation module configured to:
allocate a first set of time periods for downlink frame transmissions in said first frequency band corresponding to time periods of said first recurring interference signal; and
allocate a second set of time periods for uplink frame transmissions in said first frequency band corresponding to time periods of lower interference than the time periods of said allocated first set of time periods.

18. The communications device of claim 14 wherein said interference monitoring module is further configured to:
monitor said first frequency band for interference, said monitoring detecting said first recurring interference signal.

19. A non-transitory machine readable medium including machine executable instruction which when executed by a processor of a communications device, control the communications device to:
monitor a second frequency band for interference or receiving interference information from wireless terminals regarding the second frequency band, said second frequency band being different from a first frequency band, wherein said second frequency band is an uplink communications frequency band;
determine a periodicity of a first recurring interference signal;
determine a periodicity of a second recurring interference signal in said second frequency band;
select a first frame start time based on the timing of said first recurring interference signal, said first frame start time indicating a start of a first frame;
select a second frame start time based on the timing of said second recurring interference signal, said second frame start time indicating a start of a second frame;
allocate a time period defined based on said second frame start time, to a user equipment device for uplink transmissions by said user equipment device, said allocated time period being a time period during which said user equipment device is subjected to low local interference;
communicate with a user equipment device during said first frame time; and
communicate with a user equipment device during said second frame time, wherein communicating with a user equipment device during said second frame time includes receiving an uplink signal.

* * * * *